Feb. 18, 1958  C. K. LENNING  2,823,557
BRAKE PEDAL MOUNTING

Filed Dec. 21, 1953  3 Sheets-Sheet 1

INVENTOR.
CARROLL K. LENNING
BY
ATTORNEY

Feb. 18, 1958 C. K. LENNING 2,823,557
BRAKE PEDAL MOUNTING
Filed Dec. 21, 1953 3 Sheets-Sheet 2

INVENTOR.
CARROLL K. LENNING
BY
ATTORNEY

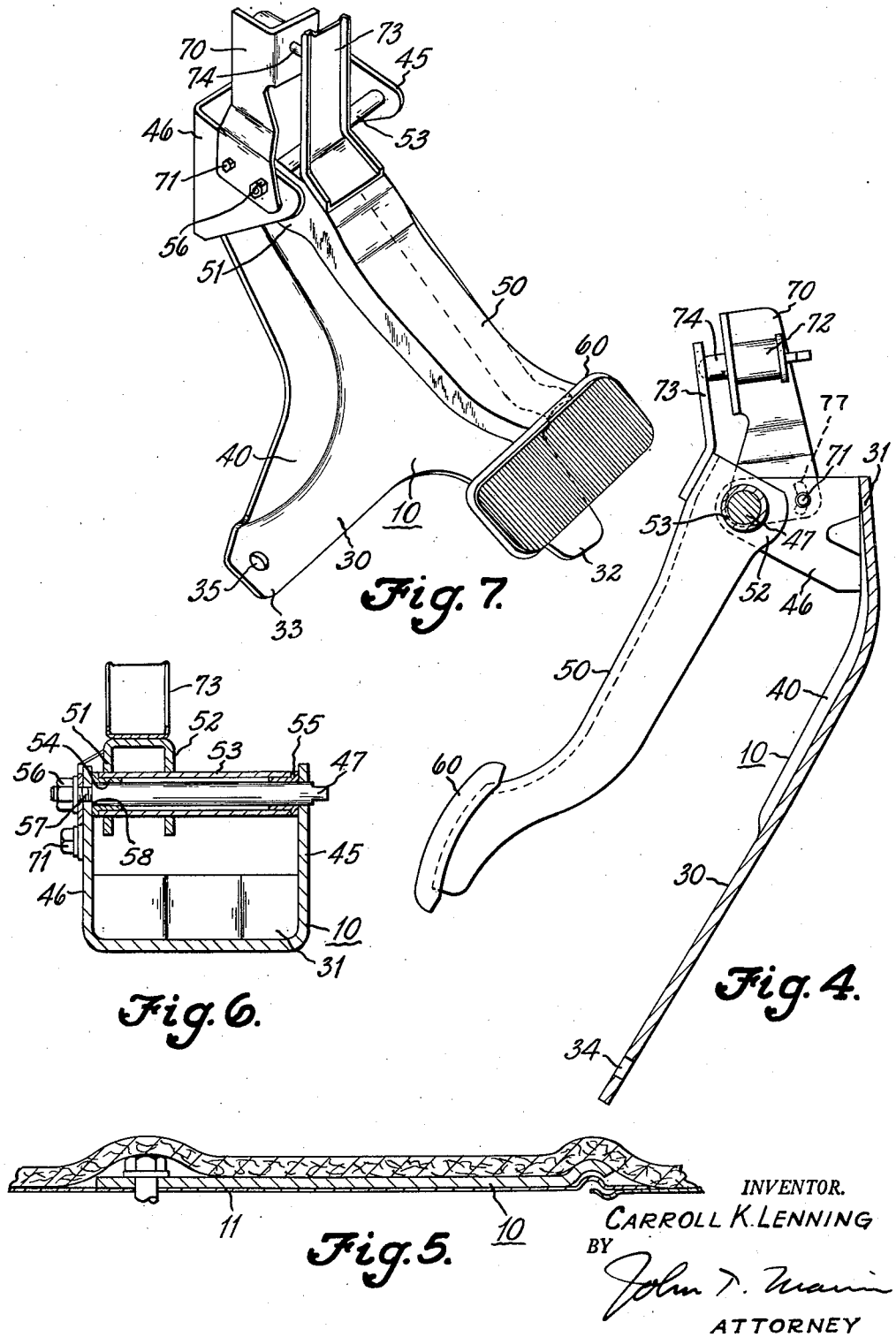

United States Patent Office 2,823,557
Patented Feb. 18, 1958

2,823,557

BRAKE PEDAL MOUNTING

Carroll Knopf Lenning, Lansing, Mich., assignor to General Motors Corporation, Detroit, Mich., a corporation of Delaware Application December 21, 1953, Serial No. 399,191

2 Claims. (Cl. 74—512)

This invention relates to a suspension system for the brake pedal provided in a motor vehicle.

It is becoming increasingly popular to provide power actuating units for the brake system of passenger automobiles. This entails the mounting of a power actuating device on the motor vehicle in a position that it can be readily connected with the brake pedal of the vehicle. It is desirable to mount the power actuating unit at a floor wall of the passenger compartment of the motor vehicle closely adjacent the brake lever or brake pedal that is mounted within the passenger compartment to provide for close coupling of the power actuating unit with the brake pedal, and thereby eliminate a system of levers for operating the power actuating unit from the brake pedal.

It has been customary to mount the power actuating unit and the brake pedal independently on the motor vehicle and to provide a suitable connection between the brake pedal and the actuating unit.

However, manufacturing variations being what they are, creates a substantial problem in providing for accurate positioning of the brake pedal relative to the power actuating unit so that the actuator that extends between the actuating unit and the brake pedal will move in a predetermined axial movement within the power actuating unit. Substantial displacement of the position of the brake pedal relative to the power actuating unit results in substantial displacement of the actuating member that extends between the brake pedal and the power actuating unit so that the forces urging operation of the power actuating unit are not maintained truly axial of the unit. This results in erratic operation of the power actuating unit.

It is therefore an object of this invention to provide a suspension system for a brake pedal and a power actuating unit wherein the brake pedal and the power actuating unit are both carried upon a single mounting plate whereby manufacturing tolerances of positioning of the brake pedal relative to the power actuating unit can be more accurately controlled.

Still another object of the invention is to provide a suspension system for a brake pedal and a power actuating unit operated thereby wherein the mounting plate on which the brake pedal and the power unit are both mounted also provides a means for retaining the grommet surrounding the steering column in position upon the floor wall of the vehicle so as to close the floor opening between the steering column and the floor wall.

Further objects and advantages of the present invention will be apparent from the following description, reference being had to the accompanying drawings wherein a preferred form of the invention is clearly shown.

In the drawings:

Figure 4 is a longitudinal cross sectional view taken along line 4—4 of Figure 2.

Figure 5 is a transverse cross sectional view taken along line 5—5 of Figure 2.

Figure 6 is a transverse cross sectional view taken along line 6—6 of Figure 2.

Figure 7 is a perspective elevational view of the brake pedal and bracket mounting plate of the invention.

Figure 1:
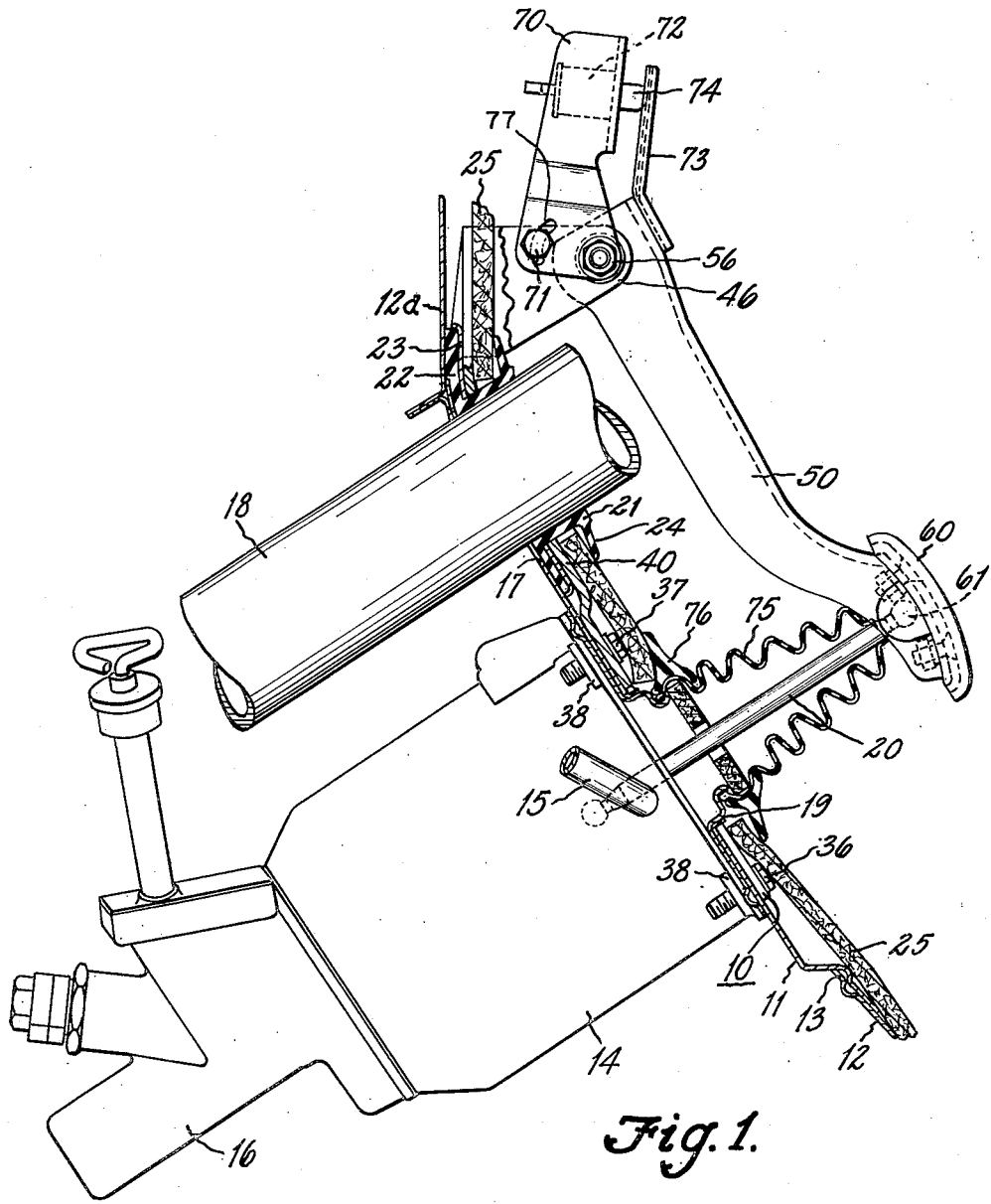
Figure 1 is a longitudinal cross sectional view of the apparatus taken along line 1—1 of Figure 2.

In this invention the suspension system consists of a support plate 10 that is positioned upon a closure plate 11 forming a part of the floor wall 12 and closing the opening 13 through which the power unit 14 may be installed or removed.

The power unit 14 can be of any conventional type currently in use in motor vehicles and is adapted to be operated by a source of vacuum such as the intake manifold of the engine of the motor vehicle. The power unit 14 is connected with the intake of the manifold of the engine by means of a pipe connection 15. The power unit 14 includes a master cylinder unit 16 that supplies hydraulic fluid under pressure to the brake lines of the motor vehicle.

The floor wall of the motor vehicle, comprising the wall 12 and the cover plate 11 has an opening 17 through which the steering column 18 of the motor vehicle extends. A second opening 19 is provided below the steering column 18 through which an actuating rod 20 extends for connection with the power actuating unit to operate the same.

The steering column 18 is provided with a grommet 21 that closely surrounds the steering column and has a flanged portion 22 that rests upon the floor wall 12 of the vehicle. The flange 22 is preferably metal-encased by the sheet metal member 23. The grommet 21 includes an upper flange 24 that rests upon the conventional floor mat 25 provided in a motor vehicle to close the opening provided in the floor mat through which the steering column 18 extends.

The support plate 10 comprises a flat portion 30 that rests upon the floor wall of the motor vehicle, and specifically on the cover plate 11. The flat portion 30 extends upwardly in an extending portion 31 that lays adjacent the vertical wall portion 12A of the floor wall that separates the engine compartment from the passenger compartment of the vehicle.

Figure 2:
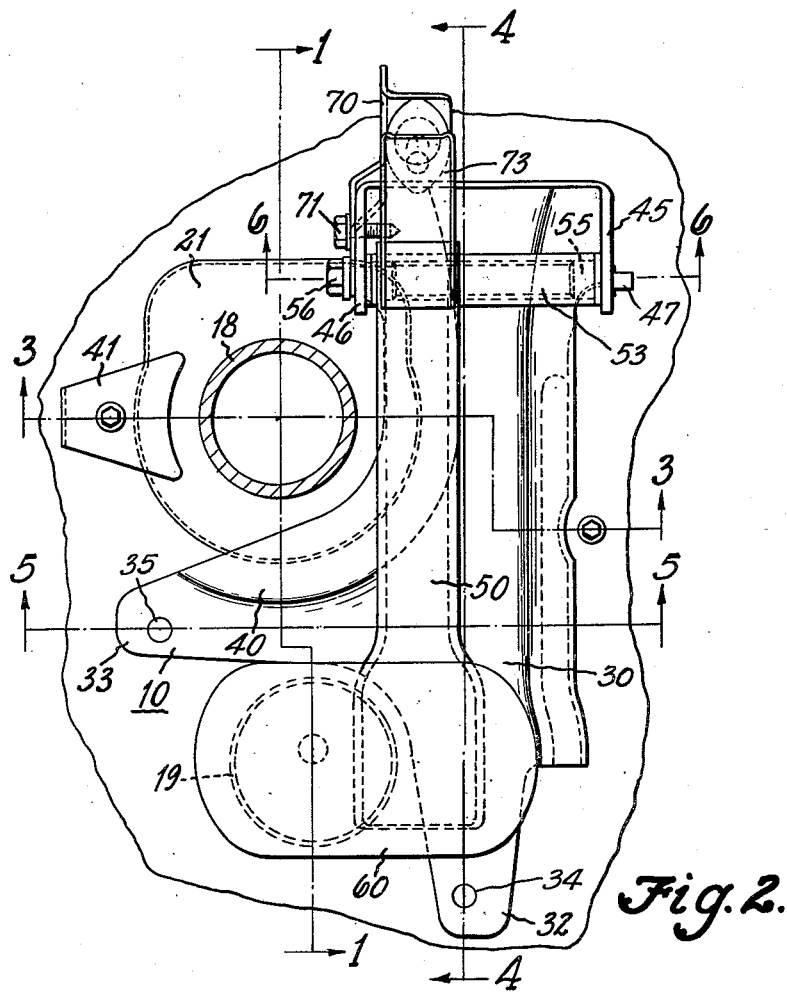
Figure 2 is a plan view of the apparatus of Figure 1.
Figure 3:
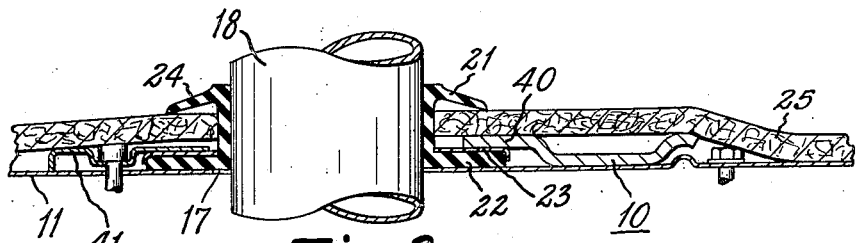
Figure 3 is a transverse cross sectional view taken along line 3—3 of Figure 2.

The support plate 10 has the flat portion 30 forming a downwardly extending leg 32 that is positioned adjacent the opening 19 through which the actuating rod 20 extends. A transversely extending leg portion 33 projects from the flat portion 30 and is positioned between the openings 19 and 17, as illustrated in Figure 2. The legs 32 and 33 are provided with bolt holes 34 and 35 respectively that receive bolts 36 and 37 that extend between the support plate 10 and bolt receiving lugs 38 on the power actuating unit 14, the bolts 37 extending through suitable holes provided in the floor wall comprising the cover plate 11. Thus the support plate 10 is placed in a specific position relative to the power unit 14, and with respect to the opening 19 in the floor wall portion 11. The support plate 10 is also positioned in a specific location relative to the actuating rod 20 of the power actuating unit 14 that extends through the opening 19 in the floor wall of the vehicle.

The support plate 10 has a raised portion 40 along one edge thereof that rests upon the flange 22 of the steering column grommet 21 whereby to hold the steering column grommet in alignment with the opening 17 of the floor wall cover plate 11. A fastening device 41 is provided on the opposite side of the grommet 21 to aid in retaining the same in position on the floor wall of the vehicle.

The upper end 31 of the support plate 10 is provided with mounting brackets 45 and 46 formed integral with the plate 10 and substantially normal to the face of the plate, and parallel with one another. The mounting brackets 45 and 46 form a pivot support that receives a pivot rod 47 on which the brake pedal suspension arm 50 is suspended from the upper end of the arm 50.

The suspension arm 50 includes formed ears 51 and 52 on the upper end of the arm that are received upon a sleeve 53 that is suitably welded to the ears 51 and 52. The sleeve 53 is carried upon bearing sleeves 54 and 55 that in turn are supported upon the pivot rod 47. The pivot rod 47 is retained in the support brackets 46 and 45 by means of the nut 56 on the threaded portion 57 extending through the support bracket 46, a shoulder 58 on the pivot rod 47 controlling the position of the rod 47 between the brackets 46 and 45.

The lower end of the brake suspension arm 50 carries a brake pedal 60. The actuator 20 for the power actuating unit 14 is provided with a ball head 61 resting in a suitable ball socket on the rear side of the brake pedal 60. The opposite end of the actuator 20 engages the operating mechanism for the power actuating unit 14 in conventional manner.

By placing the brake pedal suspension arm 50 directly on the support plate 10 that also carries the power actuating unit 14, a sufficient degree of control can be maintained over the position of the brake pedal 60 relative to the power actuating unit 14 that the actuating rod 20 will enter the power actuating unit at the proper angle and thereby eliminate much difficulty that has arisen resulting from a difference in thrust angle of the actuator 20 caused by a varying position of the brake pedal 60 relative to the power actuating unit 14 that is caused by varying manufacturing tolerances between the mounting point of the brake pedal suspension arm 50 and the mounting of the power unit 14 separately on the floor wall 11, 12 of the motor vehicle.

A bracket member 70 is carried on the mounting bracket 46 by means of the nut 56 and a bolt 71 in segmental slot 77. This bracket 70 carries an electric switch 72 that forms the stop light switch for the motor vehicle. The brake pedal suspension arm 50 carries an actuating member 73 that engages the operating button 74 of the switch 72 whereby to operate the same in response to movements of the arm 50.

The opening 19 around the actuating rod 20 of the power unit 14 is closed by means of a rubber-like boot 75 and a grommet 76 that also engages the upper face of the floor mat 25.

While the form of embodiment of the invention as herein disclosed constitutes a preferred form, it is to be understood that other forms might be adopted as may come within the scope of the claims which follow.

What is claimed is as follows:

1. In a motor vehicle, the combination of, a floor wall having a first opening therein adapted to receive a steering column and a second opening adapted to receive a brake actuator, a steering column grommet on one side of said wall aligned with said first opening, a brake actuating mechanism support plate on said one side of said wall extending longitudinally adjacent said openings and having a transversely extending arm portion disposed between said openings, said arm portion and the longitudinally extending portion of said plate adjacent said steering column engaging a portion of the periphery of said grommet to hold the same in position relative to said first opening, a brake actuating device positioned on the opposite side of said floor wall at the lower end of said plate in respect to the positioning thereof on the vehicle and including an actuating device extending through said second opening, fastening means extending between the extremities of said arm and said longitudinally extending portions of said plate and said device and through said floor wall to secure said plate and said device to opposite sides of the floor wall for specific relative positioning of the plate relative to said device and retention of said grommet in position relative to said first opening, a brake pedal suspension arm including a brake pedal pad at one end thereof operatively connected at the pedal pad end to said brake actuator for actuation thereof, said plate having bracket means extending substantially normal to the face of the plate at the end thereof opposite to that on which said device is mounted to form pivot means on which said suspension arm is pivoted, and means pivotally suspending said arm on said bracket means.

2. In a motor vehicle, the combination of, a floor wall having a vertical portion and a second portion angular to the vertical portion, a support plate having a vertical portion and a second portion angular to the vertical portion positioned on the floor wall within the passenger side of the motor vehicle with the vertical and angular portions of the floor wall and the support plate coinciding, said support plate having the vertical and angular portions thereof extending generally longitudinally and having an arm projecting transversely of the longitudinally extending portion from the angular portions thereof thereby effecting a generally L shaped configuration at the lower end of the angular portion of said plate, a brake actuating device positioned at the said L shaped end of said plate with the axis of the brake actuating device disposed normal to the plane of the angular portion of said plate and between the extremities of the arms formed by the L shaped portion of said plate, said brake actuating device having an actuating member extending therefrom substantially normal to the angular portion of said plate and between the extremities of the arms formed by the L shaped portion of said plate, a brake pedal suspension arm including a brake pedal pad at one end thereof operatively connected at the pedal pad end to said actuating member for actuation thereof, said suspension arm being positioned substantially parallel to the angular portion of said plate and substantially normal to said actuating member to provide for substantially linear movement of said actuating member upon movement of said pedal pad end, the vertical portion of said support plate having projections extending therefrom forming pivot support means for said arm at the end opposite the said pad end, and pivot means extending between said projections and said arm pivotally supporting said arm on said plate for movement of the pedal pad substantially normal to the plane of the angular portion of said plate.

References Cited in the file of this patent

UNITED STATES PATENTS

| 1,124,444 | Huff | Jan. 12, 1915 |
|---|---|---|
| 1,198,495 | Wende | Sept. 19, 1916 |
| 1,788,861 | Crawford | Jan. 13, 1931 |
| 1,803,013 | Grimm | Apr. 28, 1931 |
| 2,018,023 | Kliesrath | Oct. 22, 1935 |
| 2,039,009 | Lampman et al. | Apr. 28, 1936 |
| 2,129,851 | Lee | Sept. 13, 1938 |
| 2,490,473 | Rodkey | Dec. 6, 1949 |
| 2,685,170 | Price | Aug. 3, 1954 |
| 2,779,209 | Estes et al. | Jan. 29, 1957 |

FOREIGN PATENTS

| 984,905 | France | Mar. 7, 1951 |